US012593235B2

(12) United States Patent
Bega et al.

(10) Patent No.: US 12,593,235 B2
(45) Date of Patent: Mar. 31, 2026

(54) ANALYTICS PERFORMANCE MANAGEMENT

(71) Applicant: Nokia Technologies Oy, Espoo (FI)

(72) Inventors: Dario Bega, Munich (DE); Fabio Giust, Munich (DE); Stephen Mwanje, Munich (DE)

(73) Assignee: Nokia Technologies Oy, Espoo (FI)

( * ) Notice: Subject to any disclaimer, the term of this patent is extended or adjusted under 35 U.S.C. 154(b) by 286 days.

(21) Appl. No.: 18/361,178

(22) Filed: Jul. 28, 2023

(65) Prior Publication Data

US 2024/0049032 A1     Feb. 8, 2024

Related U.S. Application Data

(60) Provisional application No. 63/395,158, filed on Aug. 4, 2022.

(51) Int. Cl.
H04W 24/10          (2009.01)
H04W 24/08          (2009.01)

(52) U.S. Cl.
CPC ........... H04W 24/10 (2013.01); H04W 24/08 (2013.01)

(58) Field of Classification Search
CPC ................. H04W 24/10; H04W 24/08; H04W 36/00226; H04L 65/1016
See application file for complete search history.

(56) References Cited

U.S. PATENT DOCUMENTS

| | | | |
|---|---|---|---|
| 2023/0142427 A1* | 5/2023 | Shariat ................. | H04W 24/10 |
| | | | 709/224 |
| 2023/0188445 A1* | 6/2023 | Xin ..................... | H04L 43/0852 |
| | | | 709/224 |
| 2024/0080245 A1* | 3/2024 | Lee ......................... | H04L 41/14 |
| 2024/0129182 A1* | 4/2024 | Derehag ............... | H04W 24/08 |

(Continued)

OTHER PUBLICATIONS

"3rd Generation Partnership Project; Technical Specification Group Services and System Aspects; Management and orchestration; 5G performance measurements (Release 17)", 3GPP TS 28.552, V17. 7.1, Jun. 2022, pp. 1-309.

(Continued)

*Primary Examiner* — Andrew W Chriss
(74) *Attorney, Agent, or Firm* — Nokia Technologies Oy

(57)          ABSTRACT

There is provided an apparatus comprising: at least one processor and at least one memory storing instructions that, when executed by the at least one processor, cause the apparatus at least to receive, at an analytics producer, a request for analytics, from an analytics consumer, wherein the request comprises a first time period, $T_A$, determine a second time period, $D_S$ for an expected time to provide the requested analytics at the analytics producer, provide the analytics based on the request in a third time period, $T_D$, determine, based on $T_A$, $D_S$ and $T_D$, which of at least one of a plurality of parameters is met and increment a counter for the determined parameter.

20 Claims, 7 Drawing Sheets

(56) References Cited

U.S. PATENT DOCUMENTS

2025/0106675 A1 *   3/2025   Kang ................... H04W 72/25

OTHER PUBLICATIONS

"3rd Generation Partnership Project; Technical Specification Group Services and System Aspects;Management and orchestration; 5G end to end Key Performance Indicators (KPI) (Release 17)", 3GPP TS 28.554, V17.7.0, Jun. 2022, pp. 1-49.

"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.

"3rd Generation Partnership Project; Technical Specification Group Services and System Aspects; Architecture enhancements for 5G System (5GS) to support network data analytics services (Release 17)", 3GPP TS 23.288, V17.5.0, Jun. 2022, pp. 1-207.

"New key issue for the performance management of the NWDAF on the output KPI aspect", 3GPP TSG-SA5 Meeting #143e, S5-223459, Agenda: 6.5.6, China Telecom, Apr. 12-May 9, 2022, 3 pages.

"3rd Generation Partnership Project; Technical Specification Group Services and System Aspects; Study on Enhancement of the management aspects related to NWDAF; (Release 18)", 3GPP TR 28.864, V0.3.0, Jul. 2022, pp. 1-15.

* cited by examiner

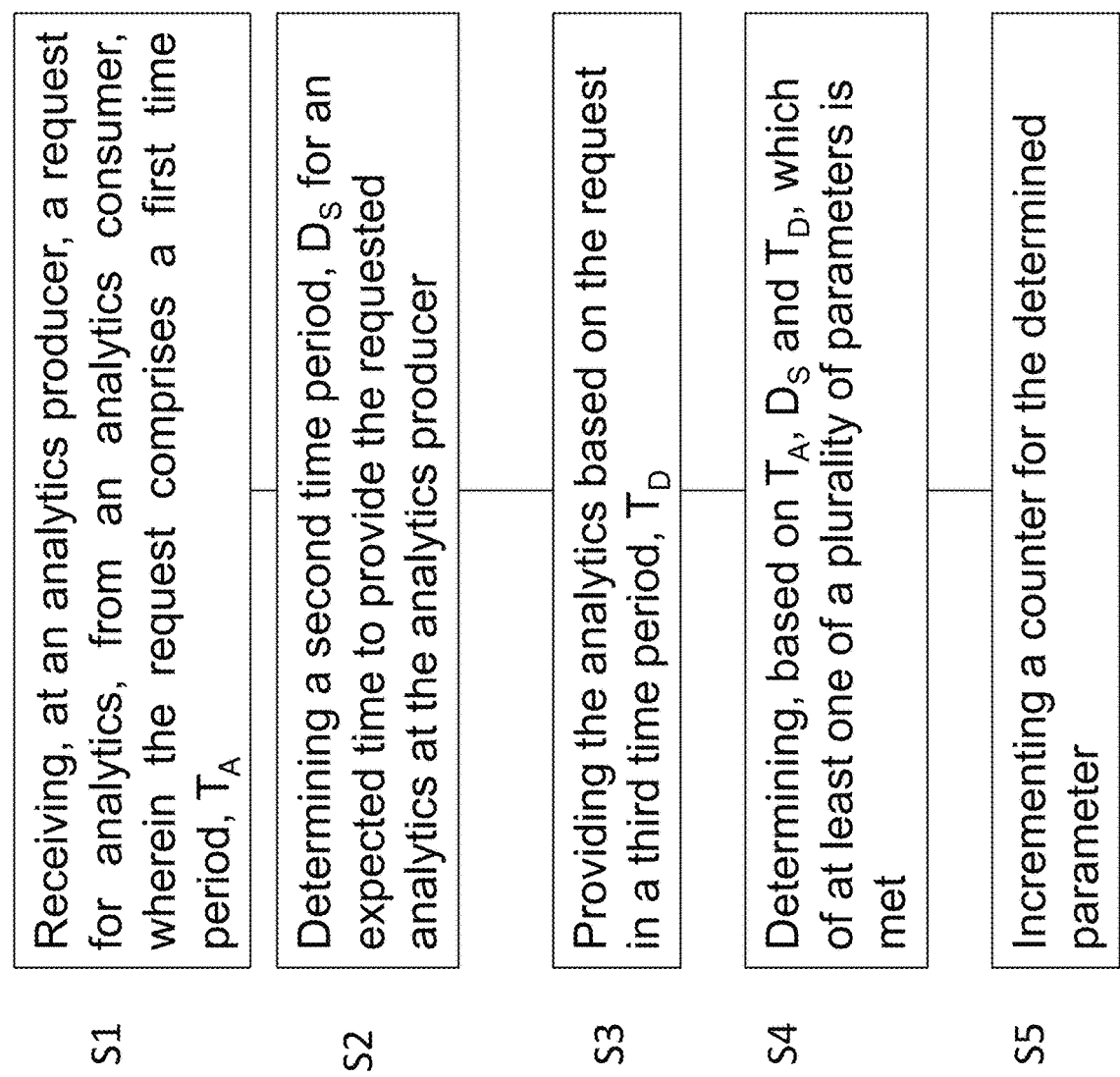

S1 — Receiving, at an analytics producer, a request for analytics, from an analytics consumer, wherein the request comprises a first time period, $T_A$ S2 — Determining a second time period, $D_S$ for an expected time to provide the requested analytics at the analytics producer S3 — Providing the analytics based on the request in a third time period, $T_D$ S4 — Determining, based on $T_A$, $D_S$ and $T_D$, which of at least one of a plurality of parameters is met S5 — Incrementing a counter for the determined parameter

ANALYTICS PERFORMANCE MANAGEMENT

FIELD

The present application relates to a method, apparatus, system and computer program and in particular but not exclusively to tracking and managing NWDAF timing performance.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising: at least one processor and at least one memory storing instructions that, when executed by the at least one processor, cause the apparatus at least to receive, at an analytics producer, a request for analytics, from an analytics consumer, wherein the request comprises a first time period, $T_A$, determine a second time period, $D_S$ for an expected time to provide the requested analytics at the analytics producer, provide the analytics based on the request in a third time period, $T_D$, determine, based on $T_A$, $D_S$ and $T_D$, which of at least one of a plurality of parameters is met and increment a counter for the determined parameter.

The apparatus may be caused to determine if $T_A$ is greater than or equal to $D_S$, if so, determining if $T_D$ is less than or equal to $D_S$.

The apparatus may be caused to, if $T_A$ is greater than or equal to $D_S$, and $T_D$ is greater than $D_S$, determine if $T_D$ is less than or equal to $T_A$.

The apparatus may be caused to, if $T_A$ is less than the $D_S$, determine if $T_D$ is less than or equal to $T_A$ and if not, if $T_D$ is less than or equal to $D_S$.

The counter for each of the plurality of parameters may be configured by a management function.

$D_S$ may comprise a time period for data collection, a time period for inference and a time period for trained model retrieval.

When no trained model is available for retrieval, $D_S$ may comprise a further time period, the further time period indicating a time to train a machine learning model for providing the requested analytics.

The apparatus may be caused to determine $D_S$ based on a plurality of $T_D$ values over a previous time interval.

$D_S$ may comprise at least one of the following: a maximum value, a minimum value or an average value.

The apparatus may be caused to provide the determined $D_S$ to a network function for storage, wherein each $D_S$ is associated at least one of a network status and a request target included in the analytics request.

The apparatus may be caused to determine a probability that $T_A$ is less than or equal to $D_S$ based on at least one of the following: network status or request target.

The apparatus may be caused, based on the determined probability, to provide information to the analytics consumer comprising a rejection of the request.

The information may comprise a proposed value for $T_A$, wherein the proposed value is higher than the value of $T_A$ provided in the request from the analytics consumer.

The request from the analytics consumer may comprise a request for a suggested $T_A$ and the apparatus is caused to determine a predicted $T_D$ based on at least one of the following: network status or request target and provide a suggested $T_A$ to the analytics consumer based on the determined predicted $T_D$.

In a second aspect there is provided a method comprising receiving, at an analytics producer, a request for analytics, from an analytics consumer, wherein the request comprises a first time period, $T_A$, determining a second time period, $D_S$ for an expected time to provide the requested analytics at the analytics producer, providing the analytics based on the request in a third time period, $T_D$, determining, based on $T_A$, $D_S$ and $T_D$, which of at least one of a plurality of parameters is met and incrementing a counter for the determined parameter.

The method may comprise determining if $T_A$ is greater than or equal to $D_S$, if so, determining if $T_D$ is less than or equal to $D_S$.

The method may comprise, if $T_A$ is greater than or equal to $D_S$, and $T_D$ is greater than $D_S$, determining if $T_D$ is less than or equal to $T_A$.

The method may comprise, if $T_A$ is less than the $D_S$, determining if $T_D$ is less than or equal to $T_A$ and if not, if $T_D$ is less than or equal to $D_S$.

3

The counter for each of the plurality of parameters may be configured by a management function.

$D_S$ may comprise a time period for data collection, a time period for inference and a time period for trained model retrieval.

When no trained model is available for retrieval, $D_S$ may comprise a further time period, the further time period indicating a time to train a machine learning model for providing the requested analytics.

The method may comprise determining $D_S$ based on a plurality of $T_D$ values over a previous time interval.

$D_S$ may comprise at least one of the following: a maximum value, a minimum value or an average value.

The method may comprise providing the determined $D_S$ to a network function for storage, wherein each $D_S$ is associated at least one of a network status and a request target included in the analytics request.

The method may comprise determining a probability that $T_A$ is less than or equal to $D_S$ based on at least one of the following: network status or request target.

The method may comprise, based on the determined probability, providing information to the analytics consumer comprising a rejection of the request.

The information may comprise a proposed value for $T_A$, wherein the proposed value is higher than the value of $T_A$ provided in the request from the analytics consumer.

The request from the analytics consumer may comprise a request for a suggested $T_A$ and the method may comprise determining a predicted $T_D$ based on at least one of the following: network status or request target and providing a suggested $T_A$ to the analytics consumer based on the determined predicted $T_D$.

In a third aspect there is provided an apparatus comprising means for receiving, at an analytics producer, a request for analytics, from an analytics consumer, wherein the request comprises a first time period, $T_A$, determining a second time period, $D_S$ for an expected time to provide the requested analytics at the analytics producer, providing the analytics based on the request in a third time period, $T_D$, determining, based on $T_A$, $D_S$ and $T_D$, which of at least one of a plurality of parameters is met and incrementing a counter for the determined parameter.

The apparatus may comprise means for determining if $T_A$ is greater than or equal to $D_S$, if so, determining if $T_D$ is less than or equal to $D_S$.

The apparatus may comprise means for, if $T_A$ is greater than or equal to $D_S$, and $T_D$ is greater than $D_S$, determining if $T_D$ is less than or equal to $T_A$.

The apparatus may comprise means for, if $T_A$ is less than the $D_S$, determining if $T_D$ is less than or equal to $T_A$ and if not, if $T_D$ is less than or equal to $D_S$.

The counter for each of the plurality of parameters may be configured by a management function.

$D_S$ may comprise a time period for data collection, a time period for inference and a time period for trained model retrieval.

When no trained model is available for retrieval, $D_S$ may comprise a further time period, the further time period indicating a time to train a machine learning model for providing the requested analytics.

The apparatus may comprise means for determining $D_S$ based on a plurality of $T_D$-values over a previous time interval.

$D_S$ may comprise at least one of the following: a maximum value, a minimum value or an average value.

The apparatus may comprise means for providing the determined $D_S$ to a network function for storage, wherein each $D_S$ is associated at least one of a network status and a request target included in the analytics request.

The apparatus may comprise means for determining a probability that $T_A$ is less than or equal to $D_S$ based on at least one of the following: network status or request target.

The apparatus may comprise means for, based on the determined probability, providing information to the analytics consumer comprising a rejection of the request.

The information may comprise a proposed value for $T_A$, wherein the proposed value is higher than the value of $T_A$ provided in the request from the analytics consumer.

The request from the analytics consumer may comprise a request for a suggested $T_A$ and the apparatus may comprise means for determining a predicted $T_D$ based on at least one of the following: network status or request target and providing a suggested $T_A$ to the analytics consumer based on the determined predicted $T_D$.

In a fourth aspect there is provided a computer readable medium comprising instructions which, when executed by an apparatus, cause the apparatus to perform at least the following: receiving, at an analytics producer, a request for analytics, from an analytics consumer, wherein the request comprises a first time period, $T_A$, determining a second time period, $D_S$ for an expected time to provide the requested analytics at the analytics producer, providing the analytics based on the request in a third time period, $T_D$, determining, based on $T_A$, $D_S$ and $T_D$, which of at least one of a plurality of parameters is met and incrementing a counter for the determined parameter.

The apparatus may be caused to perform determining if $T_D$ is less than or equal to $D_S$.

The apparatus may be caused to perform, if $T_A$ is greater than or equal to $D_S$, and $T_D$ is greater than $D_S$, determining if $T_D$ is less than or equal to $T_A$.

The apparatus may be caused to perform, if $T_A$ is less than the $D_S$, determining if $T_D$ is less than or equal to $T_A$ and if not, if $T_D$ is less than or equal to $D_S$.

The counter for each of the plurality of parameters may be configured by a management function.

$D_S$ may comprise a time period for data collection, a time period for inference and a time period for trained model retrieval.

When no trained model is available for retrieval, $D_S$ may comprise a further time period, the further time period indicating a time to train a machine learning model for providing the requested analytics.

The apparatus may be caused to perform determining $D_S$ based on a plurality of $T_D$ values over a previous time interval.

$D_S$ may comprise at least one of the following: a maximum value, a minimum value or an average value.

The apparatus may be caused to perform providing the determined $D_S$ to a network function for storage, wherein each $D_S$ is associated at least one of a network status and a request target included in the analytics request.

The apparatus may be caused to perform determining a probability that $T_A$ is less than or equal to $D_S$ based on at least one of the following: network status or request target.

The apparatus may be caused to perform, based on the determined probability, providing information to the analytics consumer comprising a rejection of the request.

The information may comprise a proposed value for $T_A$, wherein the proposed value is higher than the value of $T_A$ provided in the request from the analytics consumer.

The request from the analytics consumer may comprise a request for a suggested $T_A$ and the apparatus may be caused to perform determining a predicted $T_D$ based on at least one of the following: network status or request target and providing a suggested $T_A$ to the analytics consumer based on the determined predicted $T_D$.

In a fifth aspect there is provided a non-transitory computer readable medium comprising program instructions for causing an apparatus to perform at least the method according to the second aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4 shows a flow diagram of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. Quality of Service (QoS) levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input-multiple output (M IMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
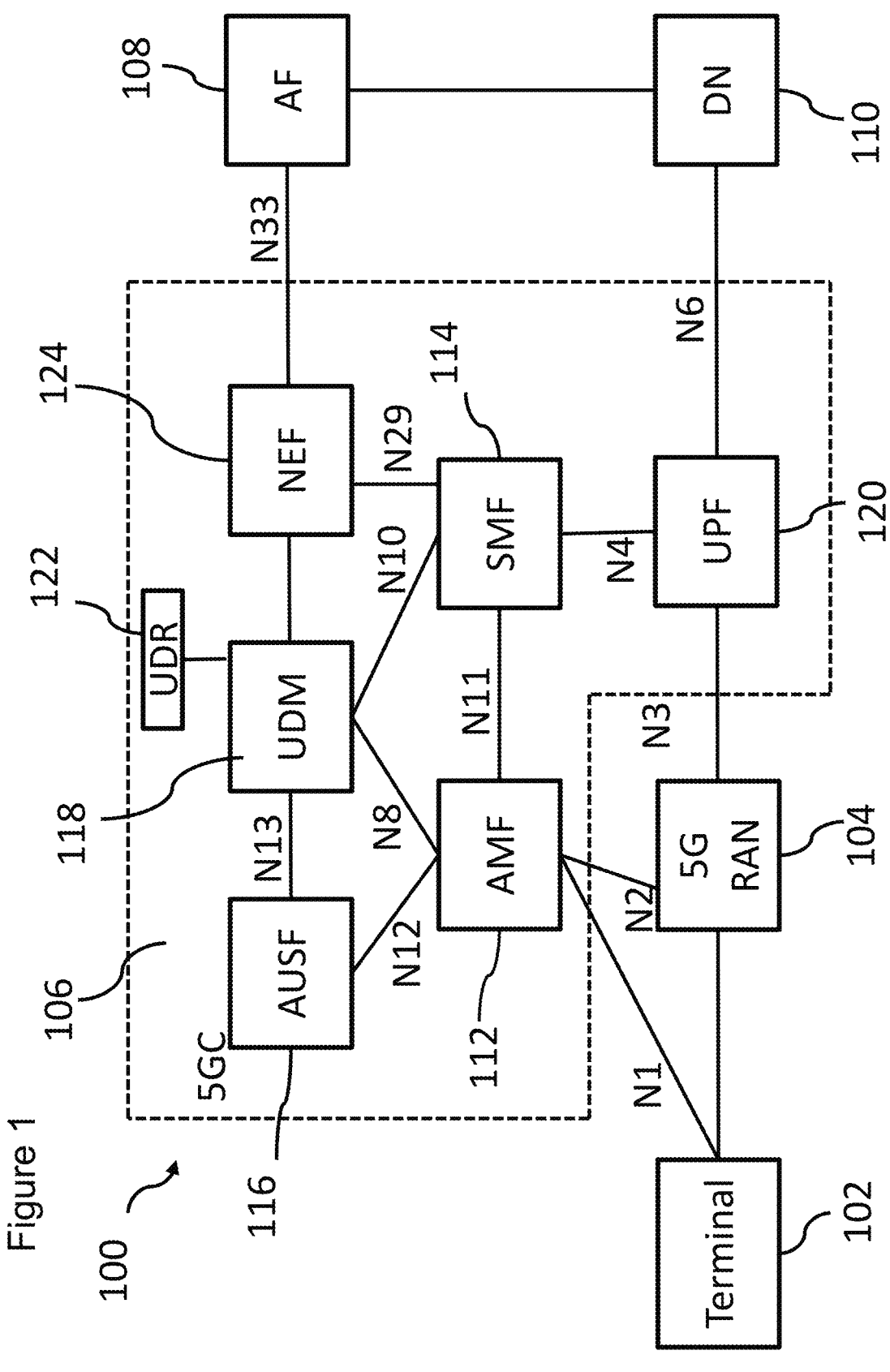
FIG. 1 shows a schematic diagram of an example 5GS communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a UE via the radio access network (RAN). The 5GRAN may comprise one or more gNodeB (GNB) distributed unit functions connected to one or more gNodeB (GNB) centralized unit functions. The RAN may comprise one or more access nodes.

A User Plane Function (UPF) referred to as PDU Session Anchor (PSA) may be responsible for forwarding frames back and forth between the DN and the tunnels established over the 5G towards the UE(s) exchanging traffic with the DN.

The CN may comprise a network data analytics function (NWDAF) which provides analytics to core NFs and operation administration and maintenance (OAM) entities.

Figure 2:
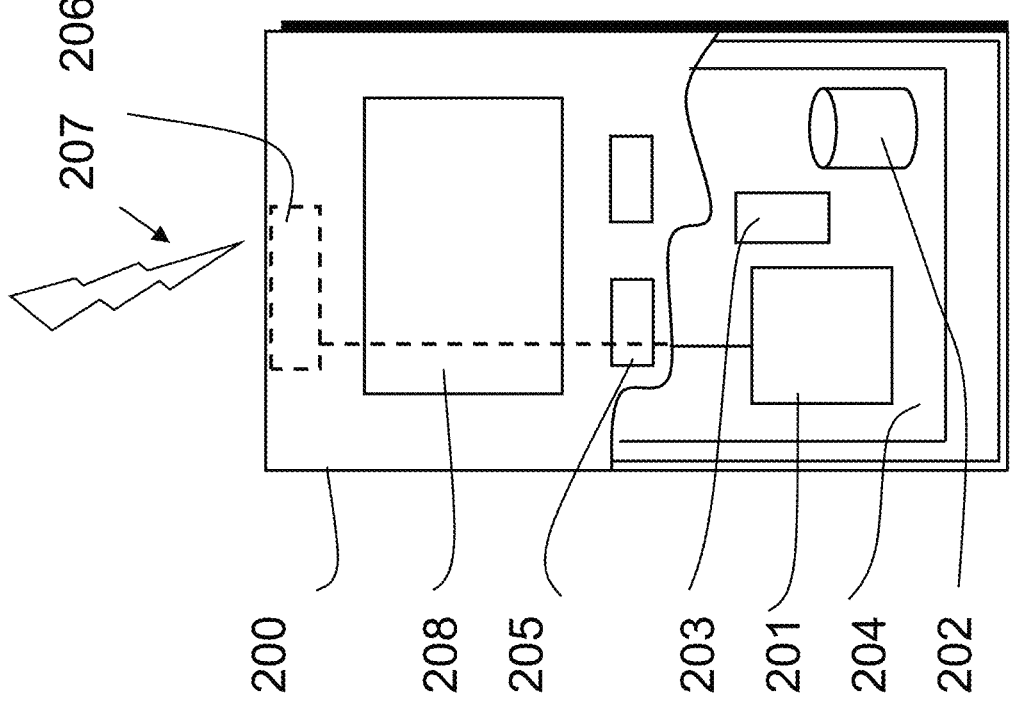
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
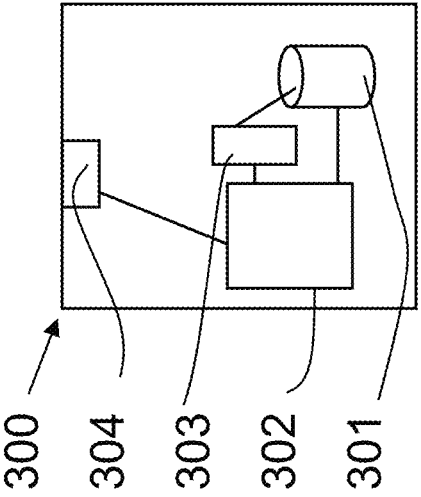
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302,303 and an input/output interface 304. Via the interface the control apparatus can be coupled to a receiver and a transmitter of the base station. The receiver and/or the transmitter may be implemented as a radio front end or a remote radio head.

Performance management of the network data analytics function (NWDAF), in particular, capturing errors due to timer expiration is being considered.

According to 3GPP specification, the optional timer "Time when analytics information is needed" may be specified during an analytics subscription/request sent to the NWDAF by an analytics consumer. The timer indicates to the NWDAF the latest time at which the analytics consumer expects to receive the requested analytics data. Meanwhile, the NWDAF has a timer for delay per Analytics ID, referred to as "Supported Analytics Delay", that is specified in the NWDAF profile (and hence stored at the network function repository function (NRF)) and indicates the amount of time per Analytics ID that is expected to lapse between the instant that the NWDAF receives a request for analytics and the time point at which the NW DAF delivers the corresponding analytics report. According to specifications, the timer "Time when analytics information is needed" should not be set to a value lower than "Supported Analytics Delay".

If the timer "Time when analytics information is needed" is reached but the analytics information is not ready, the UNSATISFIED REQUESTED ANALYTICS TIME error message might be returned, while if the timer "Time when analytics information is needed" is set to a value lower than "Supported Analytics Delay", it is expected that the NWDAF might not be able to treat the Analytics ID on time.

How to track timer expiries and how NWDAF should handle them is not described in current 3GPP specifications. In the management domain, the performance management of NWDAF related to errors generated by expiration of "Time when analytics information is needed" is not given. It may be useful to introduce performance measurement and key performance indicators (KPIs) for performance management of the NWDAF based on this aspect.

It is also unclear how to handle the timers if an analytics consumer requests an Analytics for which there is no trained model available. The specifications indicate that NWDAF should trigger ML model training, but the time required for that operation (which may be significant in certain circumstances) is not taken into account in the "Supported Analytics Delay" attribute.

Let $D_S$ denote the "Supported Analytics Delay", with $T_A$ the "Time when Analytics is needed" and $T_D$ the time when the Analytics is delivered to the consumer. Then the following cases are possible in the NWDAF operations:

1. $T_D \leq D_S \leq T_A$: in this case the consumer analytics request is correctly configured to be greater or equal to the supported delay and the delivery time is met.
2. $D_S < T_D \leq T_A$: in this case the analytics is delivered to the consumer after the supported delay but by the deadline requested by the consumer. This is an internal error of NWDAF with no impact on the consumer
3. $D_S \leq T_A < T_D$: in this case, the analytics is delivered after the deadline requested by the consumer, the consumer may no longer need the analytics.
4. $T_D \leq T_A < D_S$: in this case, the analytics is delivered by the deadline requested by the consumer but the consumer is misconfigured with a time smaller than the supported delay and NWDAF may reject the consumer's request. If the request is accepted by the NWDAF, the result is counted as delivered on time and there's no impact on the consumer.
5. $T_A < T_D \leq D_S$: in this case, the analytics is delivered before the supported delay but not by the deadline requested by the consumer, if the deadline is misconfigured with a time smaller than the supported delay, NWDAF might reject the consumer's request. If the request is accepted by the NWDAF, the result is counted as delivered on time, but the consumer may no longer need the analytics.
6. $T_A < D_S < T_D$: in this case, the analytics is delivered after both the supported delay and the deadline, but the deadline is misconfigured with a time value smaller than the supported delay so that the NWDAF might reject the consumer's request. If the request is accepted, the result is counted as not delivered on time and the consumer may no longer need the analytics.

FIG. 4 shows a flowchart of a method according to an example embodiment.

In S1, the method comprises receiving, at an analytics producer, a request for analytics, from an analytics consumer, wherein the request comprises a first time period, $T_A$.

In S2, the method comprises determining a second time period, $D_S$ for an expected time to provide the requested analytics at the analytics producer.

In S3, the method comprises providing the analytics based on the request in a third time period, $T_D$.

In S4, the method comprises determining, based on $T_A$, $D_S$ and $T_D$, which of at least one of a plurality of parameters is met.

In S5, the method comprises incrementing a counter for the determined parameter.

The following example parameters may be introduced. The parameters may be included in system information (SI). The parameters may be for 5GS and produced in the NW DAF.

The request for analytics from the consumer may comprise a request target.

One example parameter may be referred to as NbrAnalSuccNWDAFTimeAn. This measurement defines the number of analytics produced by the consumers requested deadline, $T_A$, when the "Time when analytics information is needed" timer is correctly set higher than "Supported Analytics Delay". This is a scenario when the operations are appropriately configured and executed, which is the case when the time when Analytics is delivered to the consumer is lower than "Supported Analytics Delay", which is itself lower than the "Time when the Analytics is needed" by the consumer.

Each measurement is an integer value. When the analytics request/subscription by NWDAF service consumer to NWDAF sets "Time when analytics information is needed" timer higher than "Supported Analytics Delay" and NWDAF produces the analytics service requested within the specified time the counter is incremented by 1.

A NbrAnalWarnSuccNWDAFTimeAn.cause information element (IE) may be introduced where Cause identifies the event cause.

One example parameter may be referred to as NbrAnalWarnSuccNWDAFTimeAn. This measurement defines the number of analytics produced before "Time when analytics information is needed" timer expiration but with a longer time than "Supported Analytics Delay". In this scenario, analytics is delivered after the supported delay but before the deadline, which is the case when the "Supported Analytics Delay" is lower than the time when Analytics is delivered to the consumer, which is itself lower than the "Time when Analytics is needed"

Each measurement is an integer value. When the analytics request/subscription by NWDAF service consumer to NWDAF sets "Time when analytics information is needed" timer higher than "Supported Analytics Delay" and NWDAF succeeds to produce the analytics service requested within the specified consumer timer but with a time longer than "Supported Analytics Delay", the counter is incremented by 1.

A NbrAnalWarnSuccNWDAFTimeAn.cause IE may be introduced where Cause identifies the event cause.

One example parameter may be referred to as NbrAnalFaiINWDAFTimeAn. This measurement defines the number of analytics failures due to "Time when analytics information is needed" timer expiration. In this scenario, analytics is delivered after the deadline requested by the consumer, which is the case when the "Supported Analytics Delay" is lower than the "Time when Analytics is needed", which is itself lower than the time when Analytics is delivered to the consumer.

Each measurement is an integer value. When an analytics request/subscription by NWDAF service consumer to NWDAF sets "Time when analytics information is needed" timer and NWDAF fails to produce the analytics service requested within the specified time, each failure increments the counter by 1 respectively.

A NbrAnalFaiINWDAFTimeAn.cause IE may be introduced where Cause identifies the failure cause.

One example parameter is NbrAnalSuccNWDAFSuppAnDelay. This measurement defines the number of analytics successes when "Time when analytics information is needed" timer has been set to a value lower than "Supported Analytics Delay". In this scenario, analytics is delivered on time but the consumer request is misconfigured, which is the case when the Analytics is delivered to the consumer is lower than the "Time when Analytics is needed", which is itself lower than the "Supported Analytics Delay".

Each measurement is an integer value. When an analytics request/subscription by NWDAF service consumer to NWDAF that sets "Time when analytics information is needed" timer to a value lower than "Supported Analytics Delay" and NWDAF succeeds to produce the analytics service requested within the specified time, each success increments the counter by 1 respectively.

A NbrAnalSuccNWDAFSuppAnDelay.cause IE may be introduced where Cause identifies the event cause.

One example parameter is NbrAnalFaiINWDAFSuppAnDelay This measurement defines the number of analytics failures due to "Timer when analytics information is needed" timer expiration when the timer has been set to a value lower than "Supported Analytics Delay". In this case, the NWDAF produced the analytics with a time lower than "Supported Analytics Delay". In this scenario, analytics is delivered before the supported delay but not by the deadline, which is the case when the analytics deadline is misconfigured such that the "Time when Analytics is needed" is lower than the time when Analytics is delivered to the consumer, which is itself lower than the "Supported Analytics Delay".

Each measurement is an integer value. When an analytics request/subscription by NWDAF service consumer to NWDAF sets "Time when analytics information is needed" timer to a value lower than "Supported Analytics Delay" and NWDAF fails to produce the analytics service requested within the specified time but the analytics service has been produced before "Supported Analytics Delay" timer, each failure increments the counter by 1 respectively. A NbrAnalFaiINWDAFSuppAnDelay.cause IE may be introduced where Cause identifies the failure cause.

One example parameter is NbrAnalFailMisconfNWDAFSuppAnDelay. This measurement defines the number of analytics failures due to "Timer when analytics information is needed" timer expiration when the timer has been set to a value lower than "Supported Analytics Delay". In this scenario, analytics is delivered after both the supported delay and the deadline, and the deadline is misconfigured, which is the case when the "Time when Analytics is needed" is lower than the "Supported Analytics Delay", which is itself lower than the time when Analytics is delivered to the consumer.

Each measurement is an integer value. When an Analytics request/subscription by NWDAF service consumer to NWDAF sets "Time when analytics information is needed" timer to a value lower than "Supported Analytics Delay" and NWDAF fails to produce the analytics service requested within the specified time, each failure increments the counter by 1 respectively.

A NbrAnalFaiINWDAFSuppAnDelay.cause IE may be introduced where Cause identifies the failure cause.

One example parameter is NbrAnalFaiINWDAFProact-TimeAn. This measurement defines the number of analytics failures due to proactive rejection of analytics request/subscription if the NWDAF predicts with high probability that an analytics request/subscription cannot be satisfied within "Timer when analytics information is needed" time.

Each measurement is an integer value. When an analytics request/subscription by NWDAF service consumer to NWDAF sets "Time when analytics information is needed" timer and NWDAF predicts with high probability that the request/subscription cannot be satisfied within the specified time, NWDAF rejects the request with an appropriate error message. Each rejection increments the counter by 1 respectively.

An NbrAnalFaiINWDAFProactTimeAn.cause IE may be introduced where Cause identifies the failure cause.

A 3GPP management system comprising parameters such as those described above may enable an authorized management service consumer e.g. an operator or a management function to configure counters in the NWDAF to track the number of occurrences of the events/scenarios as described above.

The counter for each of the plurality of parameters may be configured by a management function. The NWDAF as a network function exposes a management interface which allows operators and management functions to control and manage the NWDAF. This management interface shall support capabilities to configure the NWDAF and specifically to configure the counters above. Thereby, a management service consumer e.g., an operator or a management function, shall consume provisioning management services on the NWDAF to configure and control the counters. Among the configuration and control actions, management service consumer may activate or deactivate each of the timing counters, read the values of the timing counters, reset the timing counters, subscribe to notifications to receive information about the counters, e.g, when a certain value is reached.

Determining which of at least one of a plurality of parameters is met may comprise determining if $T_A$ is greater than or equal to $D_S$, if so, determining if $T_D$ is less than or equal to $D_S$. if $T_A$ is greater than or equal to $D_S$, and $T_D$ is greater than $D_S$, the method may comprise determining if $T_D$ is less than or equal to $T_A$.

If $T_A$ is less than the $D_S$, the method may comprise determining if $T_D$ is less than or equal to $T_A$ and if not, if $T_D$ is less than or equal to $D_S$.

Figure 5:
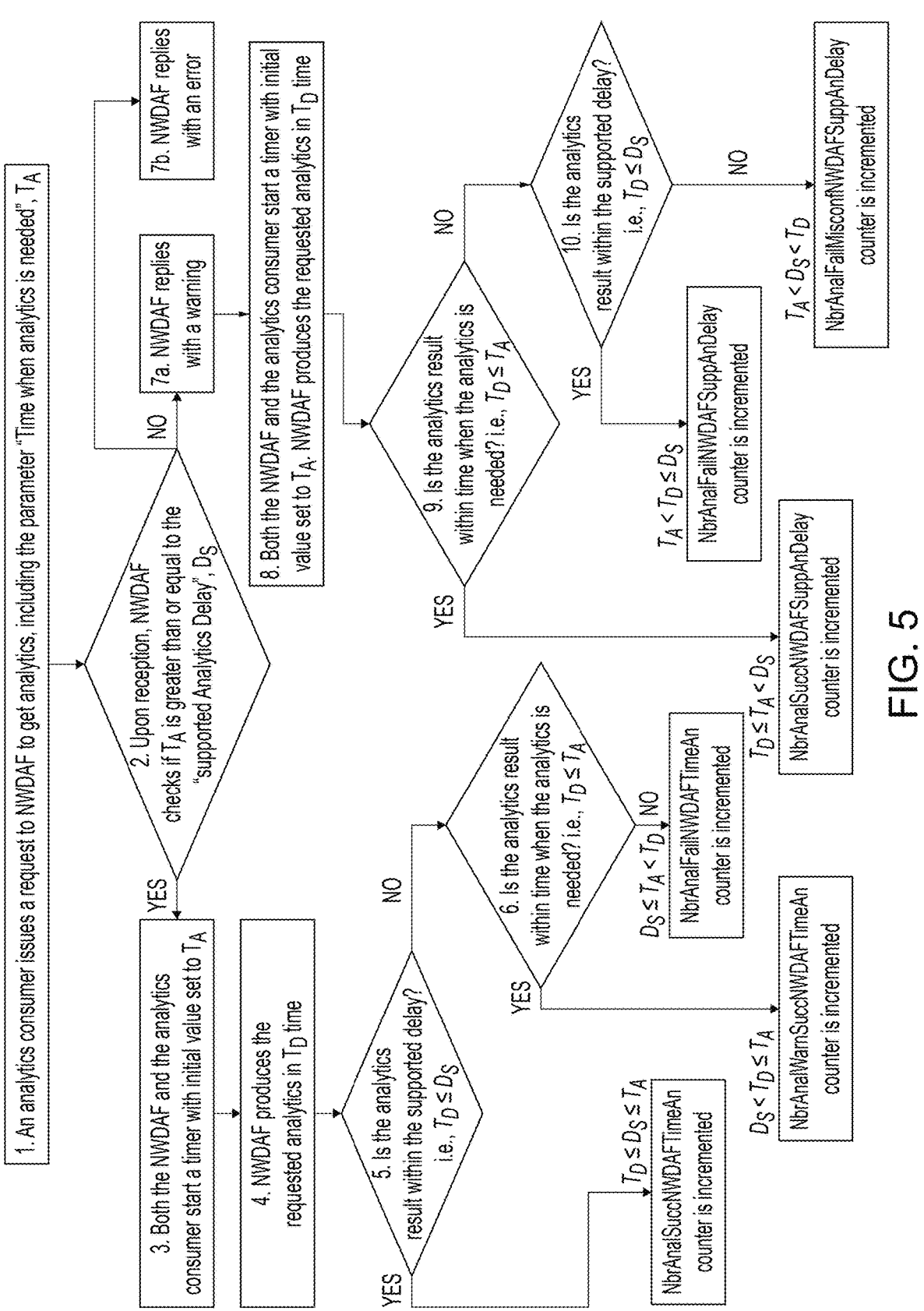
FIG. 5 shows a flow diagram according to an example embodiment.

FIG. 5 shows a flow diagram of how the counters above may be incremented in an example embodiment.

At 1, an analytics consumer issues a request to NWDAF to get analytics, including the parameter "Time when analytics is needed", $T_A$ At 2., Upon reception of the analytics request, NWDAF checks if $T_A$ is correctly configured, i.e., if it is greater than or equal to the "supported Analytics Delay", $D_S$ If the "Time when analytics is needed" parameter is correctly configured, at 3., both the NWDAF and the analytics consumer start a delivery timer with initial value set to $T_A$.

At 4., NWDAF produces the requested analytics and makes it available for delivery to the consumer. Such operation takes the time $T_D$.

At 5., if the analytics result is delivered in a time smaller than or equal to the "Supported Analytics Delay", i.e., $T_D \leq D_S$, then the analytics request is considered successfully fulfilled: the NbrAnalSuccNWDAFTimeAn counter is incremented by one unit and the delivery timer is stopped.

At 6., when the analytics result is delivered in a time greater than the "Supported Analytics Delay", and the delivery timer has not expired yet, then NWDAF increments the NbrAnalWarnSuccNWDAFTimeAn counter and stops the timer. Otherwise, if the timer expires before the delivery of the results, then the analytics request is considered not fulfilled and the NbrAnalFaiINWDAFTimeAn counter is incremented by one unit. NWDAF might return to the consumer the UNSATISFIED_REQUESTED_ANALYT-ICS_TIME error message.

If, after the check in 2., the "Time when analytics is needed" parameter is not correctly configured, then it is expected that the NWDAF might not fulfil the request in time.

At 7a., according to one embodiment, the NWDAF replies to the consumer with a warning message, indicating that the analytics might not be delivered by the time requested. The warning message might include a time information set to the value of the "Supported Analytics Delay". The Analytics consumer might then issue another analytics request including the new time value, and the procedure starts again from step 1, or do nothing. In both cases the NWDAF and the analytics consumer start a delivery timer with initial value set to latest received value of $T_A$. and the procedures continues to step 8.

At 7b., according to another embodiment, the NWDAF returns an error and rejects the request. The error message might include a time information set to the value of the "Supported Analytics Delay". The Analytics consumer might then issue another analytics request including the new time value, and the procedure starts again from step 1, or do nothing, and the procedure stops.

At 8., both the NWDAF and the analytics consumer start a delivery timer with initial value set to $T_A$. NWDAF produces the requested analytics and makes it available for delivery to the consumer. Such operation takes the time $T_D$.

At 9., if the analytics result is delivered before the delivery timer has expired, then NWDAF increments the NbrAnalSuccNWDAFSuppAnDelay counter and stops the timer.

Otherwise, at 10., when the timer expires before the delivery of the results, the analytics request is considered not fulfilled, and NWDAF returns to the consumer a UNSAT-ISFIED_REQUESTED_ANALYTICS_TIME error message. Also, if the analytics result is delivered within the supported Analytics Delay, then and the NbrAnalFai-INWDAFSuppAnDelay counter is incremented by one unit; otherwise, the NbrAnalFailMisconfNWDAFSuppAnDelay counter is incremented.

$D_S$ may comprise a time period for data collection, a time period for inference and a time period for trained model retrieval. In current specifications, "Supported Analytics Delay" takes into account the time required by data collection and inference phase. With the introduction of artificial intelligence/machine learning (AI/ML) and the usage of ML models to produce analytics, the time needed to retrieve a trained AI/ML model should be considered.

When no trained model is available for retrieval, $D_S$ may comprise a further time period, the further time period indicating a time to train a machine learning model for providing the requested analytics That is, the attribute "Supported Analytics Delay" may optionally include average time needed to train an AI/ML model in case there are not available trained AI/ML models.

In an example embodiment, "Supported Analytics Delay" is fractionated into data collection, ML model collection, inference and, optionally, training time. To this end, "Supported Analytics Training Delay", a second timer that measures the delay required to train the AI/ML model, may be introduced. If NWDAF needs to train a model, the total time needed to deliver analytics may be given by the sum of the two timers.

The consumer, when checking the delay related to an Analytics ID in NWDAF profile, if "Supported Analytics Training Delay" is higher than 0, may request to NWDAF to verify if an ML model needs to be trained for the analytics production before setting "Time when analytics information is needed" in the request/subscription. Otherwise, NWDAF may notify when receiving a request/subscription about the need of training an ML model and request the consumer to modify the timer if needed.

A method may comprise determining $D_S$ based on a plurality of $T_D$ values over a previous time interval. $D_S$ may comprise at least one of the following: a maximum value, a minimum value or an average value. The previous time interval may be a reference time interval, e.g., last hour, last day, last 7 days, etc., or a custom interval.

A method may comprise providing the determined $D_S$ to a network function (e.g., NRF) for storage, wherein each $D_S$ is associated at least one of a network status and a request target included in the request from the analytics consumer.

For example, to take into account the network status and the request target, the "Supported Analytics Delay" may be enhanced from a single value to a structure with 3 values: min, max, avg, which are computed respectively as the minimum, maximum and average value of $T_D$ samples, measured by NWDAF in the previous time interval. The so structured "Supported Analytics Delay" attribute is updated accordingly by NWDAF in its network function (NF) profile stored at the NRF. In this way, the consumer, if aware of network status or that the request is for a large target (the NWDAF may expose a new service to allow the consumer to request information about the actual network status), may set the value of the attribute in the request accordingly.

In an example embodiment, the NWDAF uses the actual network status and the request target to evaluate more precisely the time needed to produce an analytics service. NWDAF tracks and stores time needed to successfully satisfy an analytics request for different network and NWDAF status (as loaded or not loaded or for multiple load levels). Network status may include counters, KPIs, NF load status, analytics, etc.

In an example embodiment, the attribute "Supported Analytics Delay" specified in NWDAF's profile stored at NRF may be extended to include for each analytics the training time, the network status and the request target.

A method may comprise determining a probability that $T_A$ is less than or equal to $D_S$ based on at least one of the following: network status or request target or determining a predicted $T_D$ based on at least one of the following: network status or request target.

The request from the analytics consumer may comprise a request for a suggested $T_A$. The analytics producer may provide a suggested $T_A$ based on the determined predicted $T_D$.

For example, when NWDAF also tracks and stores time needed to successfully satisfy an analytics request per target, i.e., based on the requested target of analytics, different volume of data need to be collected (that clearly impacts the time required to produce the analytics). NWDAF may leverage on the history built collecting and storing this information, to predict the probability to satisfy the incoming request/subscription within the "Time when analytics information is needed". As detailed below, NWDAF may leverage this prediction to proactively reject/negotiate the time set in the analytics request/subscription saving time and resources instead of starting producing an analytics with high failure probability. Furthermore, in an example embodiment, a service attribute is introduced to allow a consumer to request to NWDAF suggestion about "Time when analytics information is needed" value for the requested Analytics based on actual network status and requested target of analytics.

Collected historical information about time needed to produce analytics related to actual network status and requested target may be stored to ADRF and retrieved when needed.

A method may comprise, based on the determined probability, providing information to the analytics consumer comprising a rejection of the request. The information may comprise a proposed value for $T_A$, wherein the proposed value is higher than the value of $T_A$ provided in the request from the analytics consumer. The information may comprise error cause information.

Figure 6:
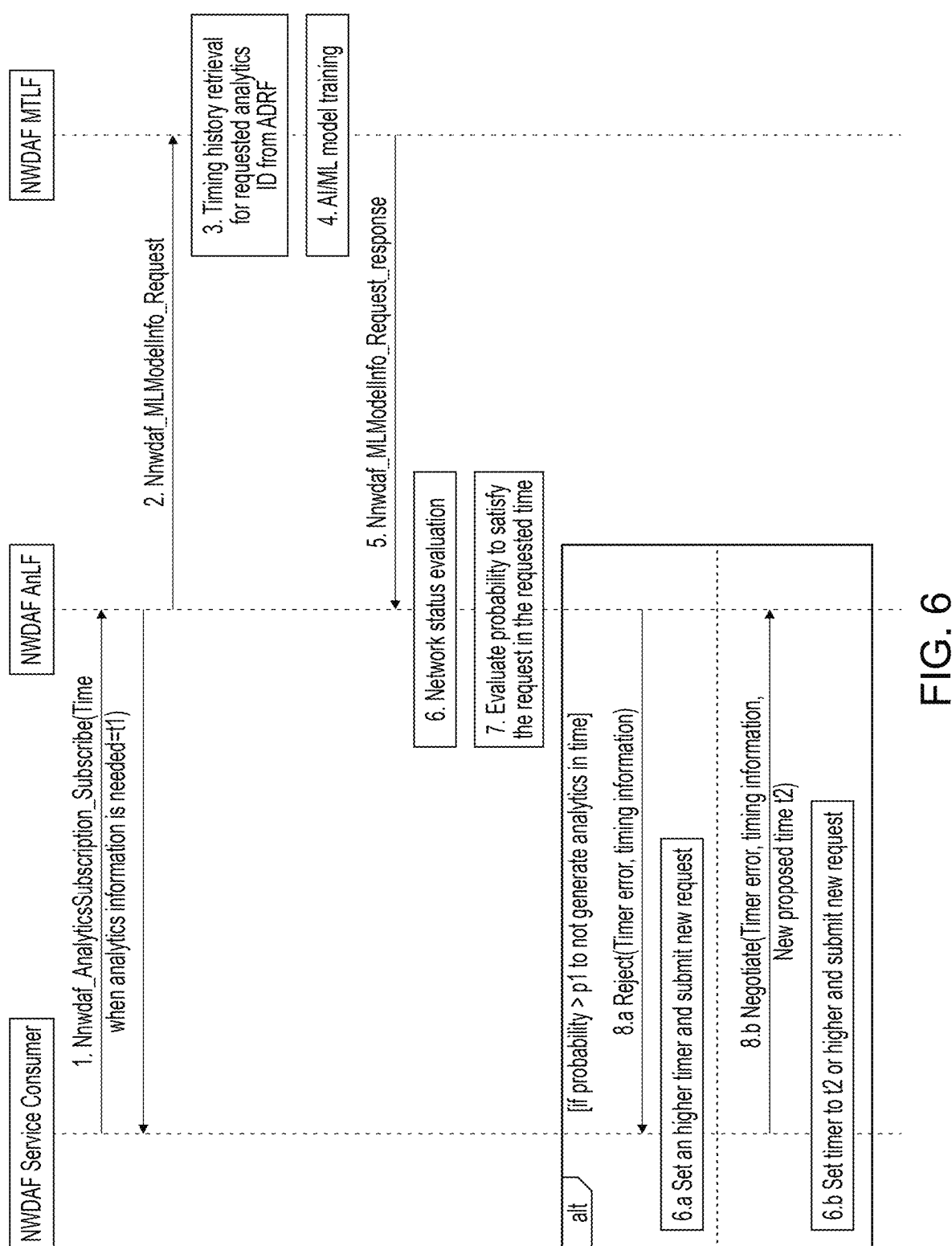
FIG. 6 shows a signalling flow according to an example embodiment.

FIG. 6 shows a signaling flow between a NWDAF service consumer, an Analytic Logical Function (AnLF) of a NWDAF and a Machine Training Logical Function (MTLF) of the NWDAF according to an example embodiment.

In 1., NWDAF Service Consumer sends a request to NWDAF including "Time when analytics information is needed" timer value t1.

In 2., NWDAF AnLF requests MTLF AI/ML model training for "Time when analytics information is needed" timer prediction.

In 3., MTLF retrieves the timing history for the requested analytics ID from the Analytics Data Repository Function (ADRF).

In 4., MTLF trains the AI/ML model.

In 5., MTLF sends the information related to the trained model to AnLF.

In 6., NWDAF AnLF evaluates the actual network status.

In 7., NWDAF evaluates the probability to satisfy the request from the service consumer in the requested time, t1.

In 8a., NWDAF AnLF rejects the request from the service consumer. The service consumer may set a higher timer value and submit a new request.

Alternatively, in 8b., NWDAF provides a new proposed time t2. The service consumer may set "Time when analytics information is needed" timer value to t2 and submit a new request.

Based on the $D_S$ values (i.e., data collection, model collection, training and inference time), collected and stored per network status and request target, NWDAF may be able to learn and predict the probability to satisfy timing requirements of an incoming request/subscription.

With the capability to predict the probabilistically best time-length needed to guarantee timely production of requested analytics, NWDAF, as shown in FIG. 6, may proactively reject an incoming request/subscription if NWDAF predicts that the requested analytics service will not be produced in time with high probability. In this case, NWDAF may avoid consumption of time, computational resources and overloading the network to produce an analytics that will fail.

In the example shown in FIG. 6, an error message is returned to the consumer specifying the type of error (e.g., error cause information). Example of errors may be a misconfiguration of "Time when analytics information is needed", network overloaded, too long to train an ML model for producing the requested analytics, too long for data collection due to specified target, etc. Instead of rejecting the incoming request/subscription, NWDAF may propose to the consumer to change the "Time when analytics information is needed" timer to a higher value. In the message, NWDAF may specify the timer error causes and an estimation of the time needed to complete the different analytics production phases.

A service attribute to allow the consumer to request to NWDAF, a "Time when analytics information is needed" suggestion based on actual network status and requested target may be provided.

Figure 7:
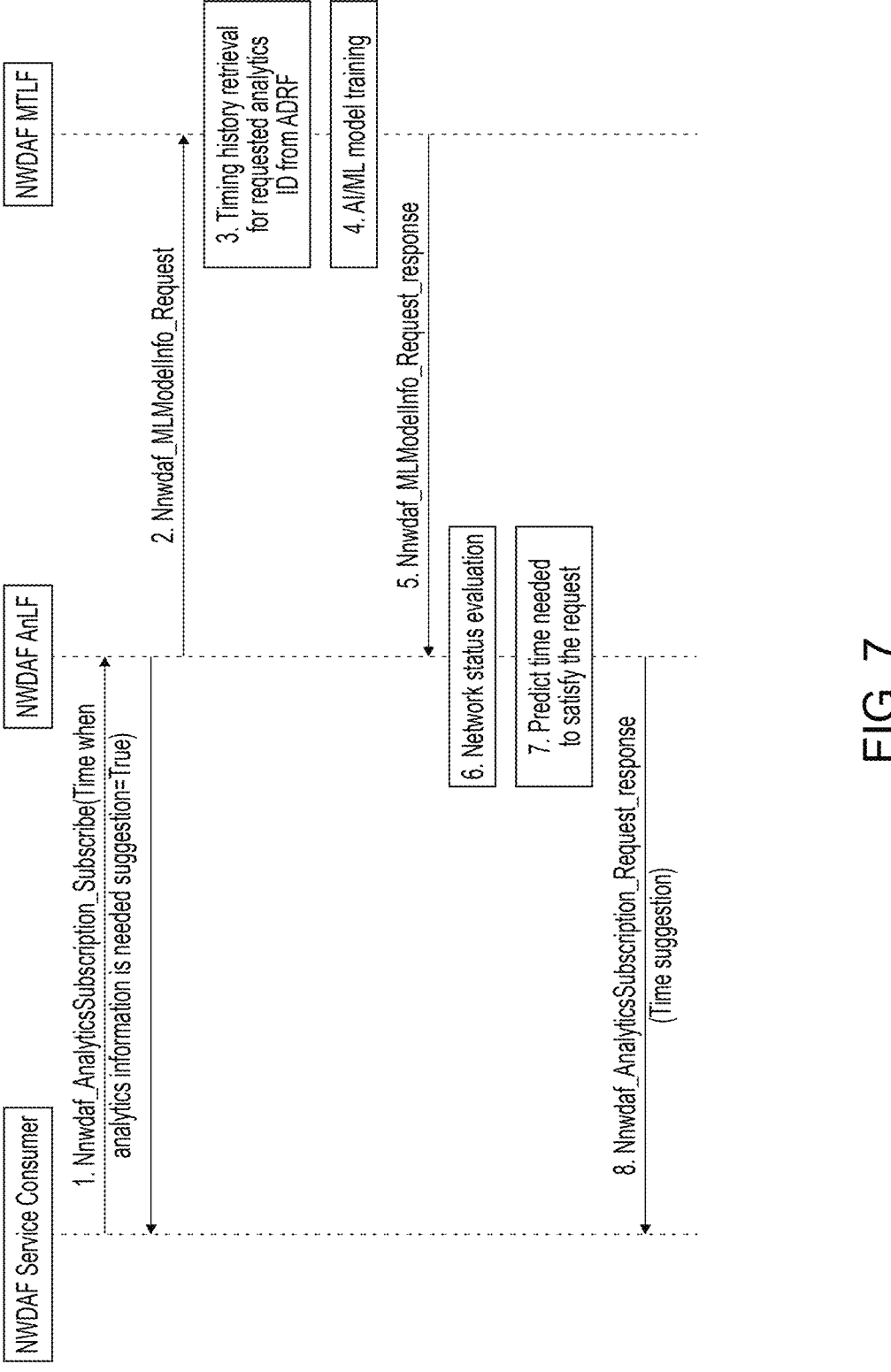
FIG. 7 shows a signalling flow according to an example embodiment.

FIG. 7 shows a signaling flow between a NWDAF service consumer, an Analytic Logical Function (AnLF) of a NWDAF and a Machine Training Logical Function (MTLF) of the NWDAF according to an example embodiment.

In 1., NWDAF Service Consumer requests NWDAF for suggestion about optimal "Time when analytics information is needed" timer value for the specified Analytics ID.

In 2., NWDAF AnLF requests MTLF AI/ML model training for "Time when analytics information is needed" timer prediction.

In 3., MTLF retrieves the timing history for the requested analytics ID from the Analytics Data Repository Function (ADRF).

In 4., MTLF trains the AI/ML model.

In 5., MTLF sends the information related to the trained model to AnLF.

In 6., NWDAF AnLF evaluates the actual network status.

In 7., NWDAF after requesting the training of an AI/ML model to MTLF (providing timing history information and actual network status), uses the trained AI/ML model to predict time needed to satisfy the analytics request.

In 8., NWDAF AnLF suggests the best time to the NWDAF service consumer.

Parameter "NbrAnalFailNWDAFProactTimeAn" may be used as a performance measurement and KPI to keep track of proactive analytics rejection events.

The method provides parameters (or performance measurements) to count the number of analytics failures and successes for all combinations of "Time when analytics information is needed" and "Supported Analytics Delay" timers. This may allow the network operator/management to track NWDAF performance in terms of errors and successes related to timers. The method may introduce enablers to manage NWDAF performance based on expiration of the "Time when analytics information is needed" timer specified by analytics consumer in the analytics subscription/request. In particular, the method may provide a mechanism to keep track of analytics production failures due to infringement of a timing attribute specified in the analytics subscription/request and/or due to analytics production respecting timing constraints.

Methods as described above may provide an extension of "Supported Analytics Delay" attribute to include also ML model training time in case of ML model algorithm and not only time needed for data collection and inference. and an extension of "Supported Analytics Delay" attribute to keep track of actual network conditions and settings (i.e., having a different delay based on network conditions and settings). "Supported Analytics Delay" may be enhanced from a single value to a structure with 3 values that enable the consumer to better set "Time when analytics information is needed" timer.

Based on captured timing information as "Time when analytics information is needed" value, time required to complete each phase (data collection, optionally training, and inference) in the actual network condition and settings including events collected in timing failures logs may be used at the NWDAF to learn and predict the probabilistically best time-length needed to guarantee timely production of requested analytics.

The method may provide NWDAF capabilities to learn the best time needed to generate analytics based on the actual network status, and proactively reject incoming analytics request (or negotiate a different timer) if NWDAF predicts with high probability that the analytics cannot be produced before the expiry of a "Time when analytics information is needed" timer.

Given the capability of NWDAF to learn and predict the probabilistically best time-length needed to guarantee timely production of requested analytics, the NWDAF may have the capability to proactively reject an analytics request returning an appropriate error message to inform the consumer that in the actual network condition, the request cannot be satisfied within the specified time. In this way, NWDAF may save time and resources that would be needed to start the generation of an analytics with high probability of delivering it late.

A capability of NWDAF to inform the analytics consumer, instead of rejecting the request, when the set time may not be long enough to guarantee timely analytics delivery and to negotiate for a longer "Time when analytics information is needed" timer if possible may be provided. The NWDAF may request the consumer to consider cancelling the request and instead submit a new one with longer "Time when analytics information is needed" timer.

An apparatus may comprise means for receiving, at an analytics producer, a request for analytics, from an analytics consumer, wherein the request comprises a first time period, $T_A$, determining a second time period, $D_S$ for an expected time to provide the requested analytics at the analytics producer, providing the analytics based on the request in a third time period, $T_D$, determining, based on $T_A$, $D_S$ and $T_D$, which of at least one of a plurality of parameters is met and incrementing a counter for the determined parameter.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising: at least one processor and at least one memory storing instructions of an analytics producer for a communication network, the instructions, when executed by the at least one processor, causing the apparatus at least to perform:

receiving a request for analytics, from an analytics consumer, wherein the request indicates a first time period ($T_A$) within which the analytics consumer expects to receive the analytics;

determining, based on the request, a second time period ($D_S$) indicating an expected time within which the apparatus expects to provide, based on the request, the analytics;

providing, to the analytics consumer, the analytics based on the request, within a third time period ($T_D$);

after the providing the analytics, determining, based on $T_A$, $D_S$ and $T_D$, which of at least one parameter of a plurality of parameters is met;

incrementing a counter for each parameter of the which of at least one parameter of a plurality of parameters is met, wherein each parameter of the plurality of parameters has a respective counter associated therewith, wherein the plurality of parameters comprise:

a parameter that indicates $T_D$ is less than or equal to $D_S$ which is less than or equal to $T_A$, a parameter that indicates $D_S$ is less than $T_D$ which is less than or equal to $T_A$, a parameter that indicates $D_S$ is less than or equal to $T_A$ which is less than $T_D$, a parameter that indicates $T_D$ is less than or equal to $T_A$ which is less than $D_S$, a parameter that indicates $T_A$ is less than $T_D$ which is less than or equal to $D_S$, and a parameter that indicates $T_A$ is less than $D_S$ which is less than $T_D$;

receiving a second request for second analytics, from the analytics consumer, wherein the second request indicates a second time period within which the analytics consumer expects to receive the second analytics;

determining based on the second request and based on each respective counter associated with each parameter of the plurality of parameters, a probability that the analytics producer is not able to generate the second analytics in response to the second request within the second time period and that the probability is above a threshold; and providing, to the analytics consumer, based on the determining the probability that the analytics producer is not able to generate the second analytics in response to the second request within the second time period and that the probability is above a threshold, information comprising a rejection of the second request.

2. The apparatus according to claim 1, wherein the instructions, when executed by the at least one processor, further cause the apparatus to:

determine if $T_A$ is greater than or equal to $D_S$, and if $T_A$ is greater than or equal to $D_S$, determine if $T_D$ is less than or equal to $D_S$.

3. The apparatus according to claim 2, wherein the instructions, when executed by the at least one processor, further cause the apparatus to:

if $T_A$ is greater than or equal to $D_S$, and $T_D$ is greater than $D_S$, determine if $T_D$ is less than or equal to $T_A$.

4. The apparatus according to claim 2, wherein the instructions, when executed by the at least one processor, further cause the apparatus to:

if $T_A$ is less than the $D_S$, determine if $T_D$ is less than or equal to $T_A$, and if $T_D$ is less than or equal to $T_A$, determine if $T_D$ is less than or equal to $D_S$.

5. The apparatus according to claim 1, wherein the respective counter is configurable according to configuration information received from a management function.

6. The apparatus according to claim 1, wherein $D_S$ comprises a time period for data collection of data for the analytics, a time period for inference of the analytics and a time period for retrieval of a trained model to be used to determine the analytics.

7. The apparatus according to claim 6, wherein, in an instance the trained model to be used to determine the analytics is not available for retrieval, $D_S$ further comprises a further time period, the further time period indicating a time to train a machine learning model to be the trained model to be used to determine the analytics.

8. The apparatus according to claim 1, wherein the determining $D_S$ comprises determining $D_S$ based on a plurality of time periods associated with the apparatus providing respective analytics based on a plurality of requests for the analytics over a previous time interval.

9. The apparatus according to claim 8, wherein $D_S$ comprises at least one of the following: a maximum value, a minimum value or an average value.

10. The apparatus according to claim 8, wherein the instructions, when executed by the at least one processor, further cause the apparatus to provide $D_S$ to a network function for storage, wherein $D_S$ is stored in association with at least one of information identifying a network status of the communication network or information identifying a request target that is included in the request.

11. The apparatus according to claim 1, wherein the instructions, when executed by the at least one processor, further cause the apparatus to determine a probability that $T_A$ is less than or equal to $D_S$ based on at least one of the following: a network status of the communication network or information identifying a request target that is included in the request.

12. The apparatus according to claim 11, wherein the instructions, when executed by the at least one processor, further cause the apparatus to, based on the probability, provide, to the analytics consumer, information comprising a rejection of the request.

13. The apparatus according to claim 12, wherein the information comprising the rejection of the request comprises a proposed $T_A$, wherein the proposed $T_A$ is higher than the $T_A$ indicated in the request from the analytics consumer.

14. The apparatus according to claim 1, wherein the request from the analytics consumer comprises a request for a suggested $T_A$, and wherein the instructions, when executed by the at least one processor, further cause the apparatus to:

determine a predicted $T_D$ based on at least one of the following: network status or information identifying a request target that is included in the request; and provide a suggested $T_A$ to the analytics consumer based on the predicted $T_D$.

15. A method comprising:

receiving, by an analytics producer of an apparatus of a communication network, a request for analytics, from an analytics consumer, wherein the request indicates a first time period ($T_A$) within which the analytics consumer expects to receive the analytics;

determining, by the analytics producer, a second time period ($D_S$) indicating an expected time within which the apparatus expects to provide, based on the request, the analytics;

providing, by the analytics producer, to the analytics consumer, the analytics based on the request, within a third time period ($T_D$);

after the providing the analytics, determining, by the analytics producer, based on $T_A$, $D_S$ and $T_D$, which of at least one parameter of a plurality of parameters is met;

incrementing, by the analytics producer, a counter for each parameter of the which of at least one parameter of a plurality of parameters is met, wherein each parameter of the plurality of parameters has a respective counter associated therewith, wherein the plurality of parameters comprise:

a parameter that indicates $T_D$ is less than or equal to $D_S$ which is less than or equal to $T_A$, a parameter that indicates $D_S$ is less than $T_D$ which is less than or equal to $T_A$, a parameter that indicates $D_S$ is less than or equal to $T_A$ which is less than $T_D$, a parameter that indicates $T_D$ is less than or equal to $T_A$ which is less than $D_S$, a parameter that indicates $T_A$ is less than $T_D$ which is less than or equal to $D_S$, and a parameter that indicates $T_A$ is less than $D_S$ which is less than $T_D$;

receiving, by the analytics producer, a second request for second analytics, from the analytics consumer, wherein the second request indicates a second time period within which the analytics consumer expects to receive the second analytics;

determining, by the analytics producer, based on the second request and based on each respective counter associated with each parameter of the plurality of parameters, a probability that the analytics producer is not able to generate the second analytics in response to the second request within the second time period and that the probability is above a threshold; and providing, by the analytics producer, to the analytics consumer, based on the determining the probability that the analytics producer is not able to generate the second analytics in response to the second request within the second time period and that the probability is above a threshold, information comprising a rejection of the second request.

16. A non-transitory computer readable medium storing instructions of an analytic producer, the instructions, when executed by an apparatus, causing the apparatus to perform at least the following:

receiving a request for analytics, from an analytics consumer, wherein the request indicates a first time period ($T_A$) within which the analytics consumer expects to receive the analytics;

determining, based on the request, a second time period ($D_S$) indicating an expected time within which the apparatus expects to provide, based on the request, the analytics;

providing, to the analytics consumer, the analytics based on the request, within a third time period ($T_D$);

after the providing the analytics, determining, based on $T_A$, $D_S$ and $T_D$, which of at least one parameter of a plurality of parameters is met;

incrementing a counter for each parameter of the which of at least one parameter of a plurality of parameters is met, wherein each parameter of the plurality of parameters has a respective counter associated therewith, wherein the plurality of parameters comprise:

a parameter that indicates $T_D$ is less than or equal to $D_S$ which is less than or equal to $T_A$, a parameter that indicates $D_S$ is less than $T_D$ which is less than or equal to $T_A$, a parameter that indicates $D_S$ is less than or equal to $T_A$ which is less than $T_D$, a parameter that indicates $T_D$ is less than or equal to $T_A$ which is less than $D_S$, a parameter that indicates $T_A$ is less than $T_D$ which is less than or equal to $D_S$, and a parameter that indicates $T_A$ is less than $D_S$ which is less than $T_D$;

receiving a second request for second analytics, from the analytics consumer, wherein the second request indicates a second time period within which the analytics consumer expects to receive the second analytics;

determining based on the second request and based on each respective counter associated with each parameter of the plurality of parameters, a probability that the analytics producer is not able to generate the second analytics in response to the second request within the second time period and that the probability is above a threshold; and providing, to the analytics consumer, based on the determining the probability that the analytics producer is not able to generate the second analytics in response to the second request within the second time period and that the probability is above a threshold, information comprising a rejection of the second request.

17. The non-transitory computer readable medium according to claim 16, wherein the instructions, when executed by the at least one processor, further cause the apparatus to:

determine if $T_A$ is greater than or equal to $D_S$, and if $T_A$ is greater than or equal to $D_S$, determine if $T_D$ is less than or equal to $D_S$.

18. The non-transitory computer readable medium according to claim 17, wherein the instructions, when executed by the at least one processor, further cause the apparatus to:

if $T_A$ is greater than or equal to $D_S$, and $T_D$ is greater than $D_S$, determine if $T_D$ is less than or equal to $T_A$.

19. The non-transitory computer readable medium according to claim 17, wherein the instructions, when executed by the at least one processor, further cause the apparatus to:

if $T_A$ is less than the $D_S$, determine if $T_D$ is less than or equal to $T_A$, and if $T_D$ is less than or equal to $T_A$, determine if $T_D$ is less than or equal to $D_S$.

20. The non-transitory computer readable medium according to claim 16, wherein $D_S$ comprises a time period for data collection of data for the analytics, a time period for inference of the analytics and a time period for retrieval of a trained model to be used to determine the analytics.

* * * * *